(12) United States Patent
Liu et al.

(10) Patent No.: US 11,682,400 B1
(45) Date of Patent: Jun. 20, 2023

(54) SPEECH PROCESSING

(71) Applicant: Amazon Technologies, Inc., Seattle, WA (US)

(72) Inventors: Beiye Liu, Bedford Hills, NY (US); Wael Hamza, Yorktown Heights, NY (US); Liwei Cai, Cambridge, MA (US); Konstantine Arkoudas, New York, NY (US); Chengwei Su, Belmont, MA (US); Subendhu Rongali, Amherst, MA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 17/106,600

(22) Filed: Nov. 30, 2020

(51) Int. Cl.
  *G10L 21/00* (2013.01)
  *G10L 15/26* (2006.01)
  *G10L 15/18* (2013.01)

(52) U.S. Cl.
  CPC .......... *G10L 15/26* (2013.01); *G10L 15/1822* (2013.01)

(58) Field of Classification Search
  CPC . G10L 15/26; G10L 15/1815; G10L 15/1822; H04L 65/1101
  USPC ........................................................ 704/270
  See application file for complete search history.

(56) References Cited

U.S. PATENT DOCUMENTS 6,970,935 B1 * 11/2005 Maes .................. H04L 65/1101
                                        709/228
11,107,462 B1 * 8/2021 Fuegen ............... G10L 15/1815

* cited by examiner

*Primary Examiner* — Md S Elahee
(74) *Attorney, Agent, or Firm* — Pierce Atwood LLP

(57) ABSTRACT

Techniques for performing spoken language understanding (SLU) processing are described. An SLU component may include an audio encoder configured to perform an audio-to-text processing task and an audio-to-NLU processing task. The SLU component may also include a joint decoder configured to perform the audio-to-text processing task, the audio-to-NLU processing task and a text-to-NLU processing task. Input audio data, representing a spoken input, is processed by the audio encoder and the joint decoder to determine NLU data corresponding to the spoken input.

20 Claims, 11 Drawing Sheets

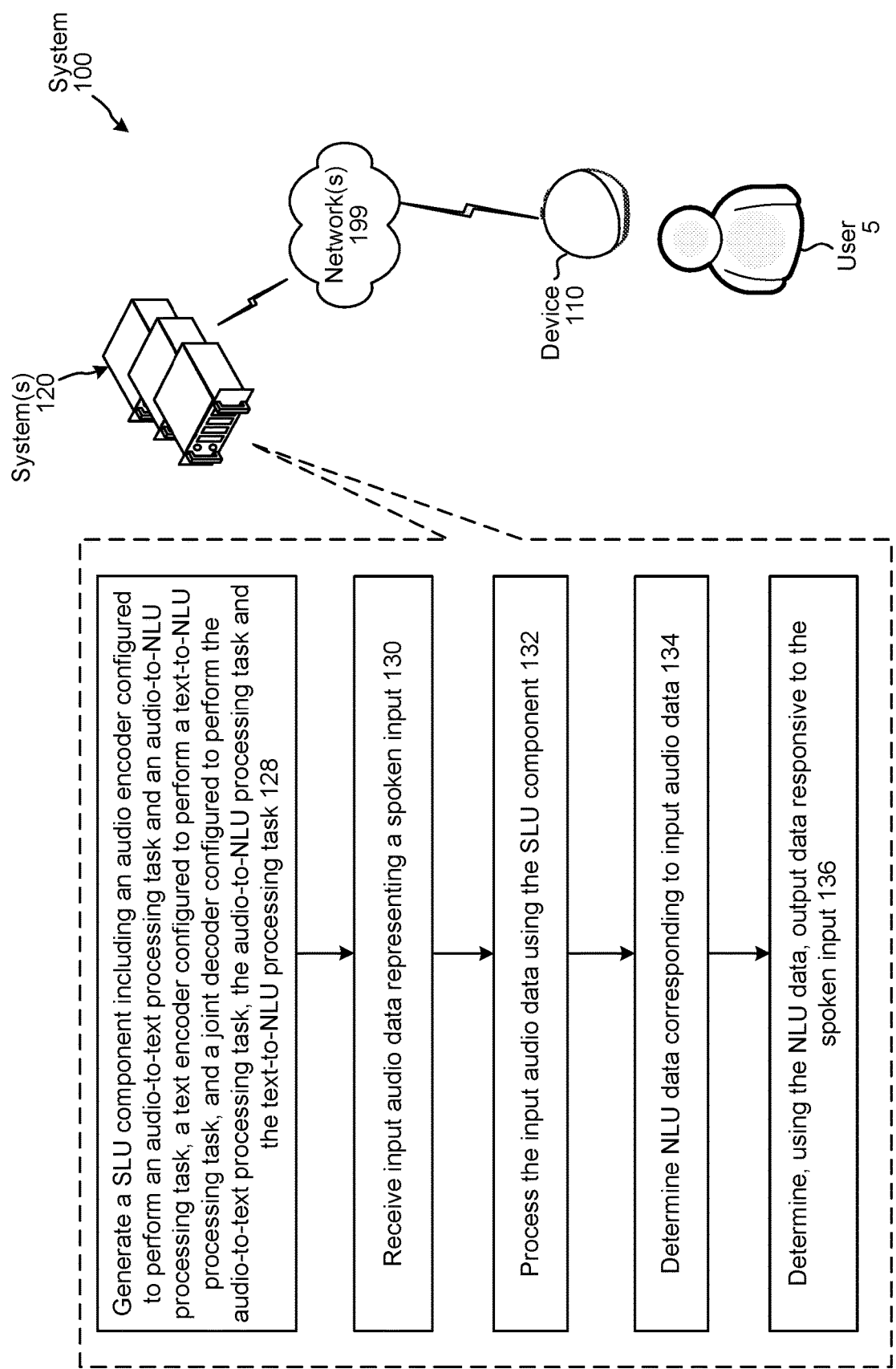

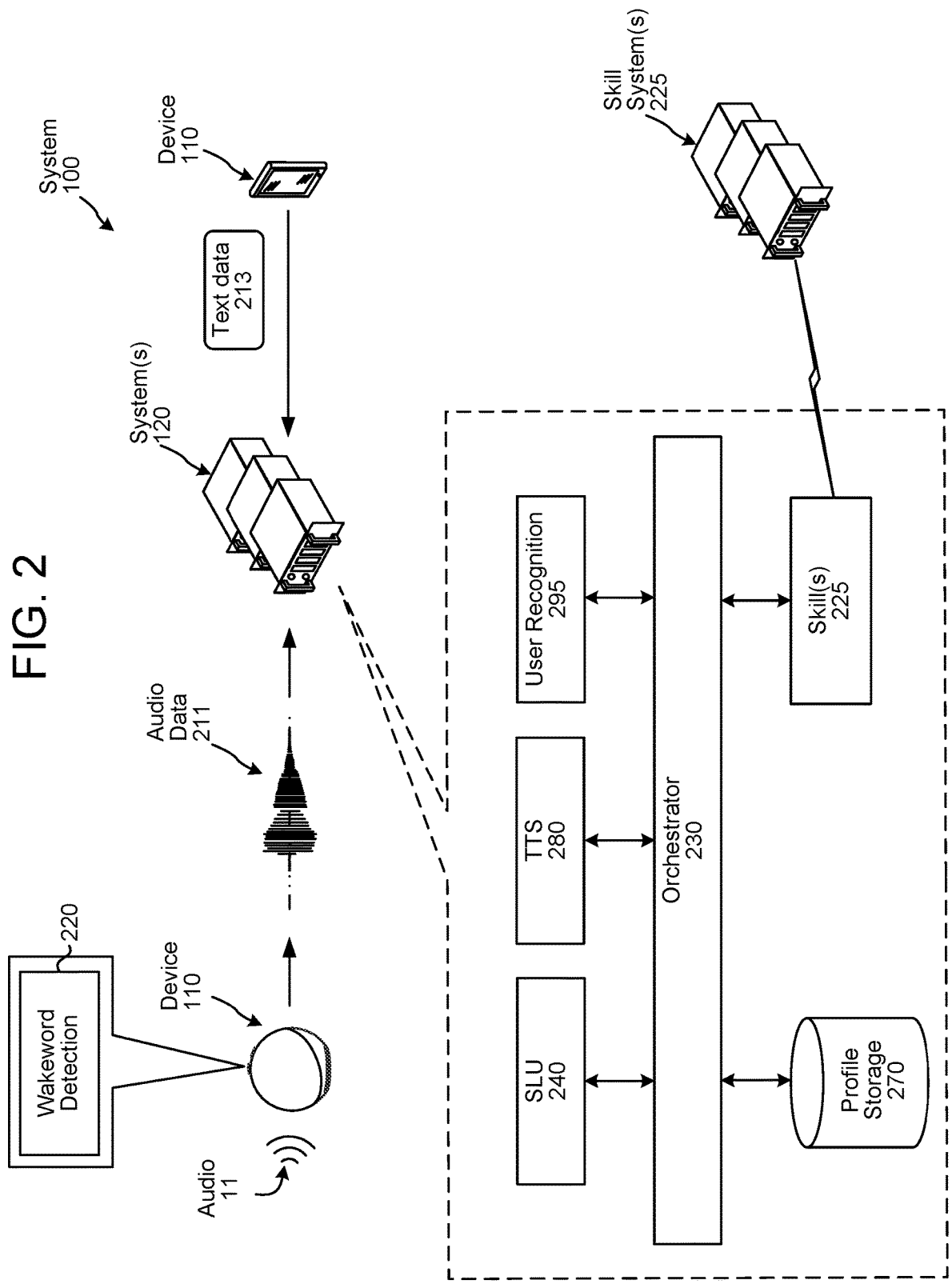

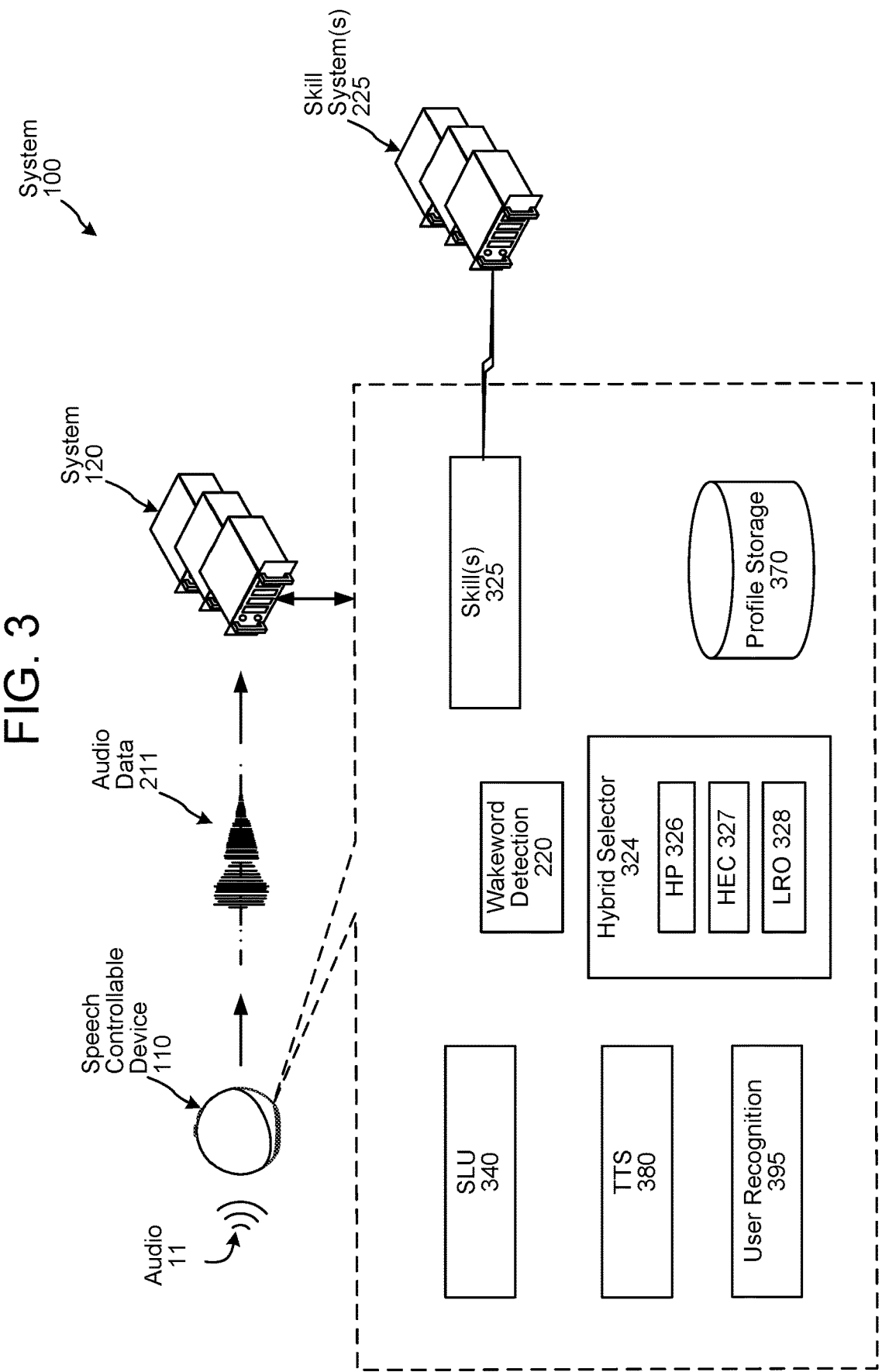

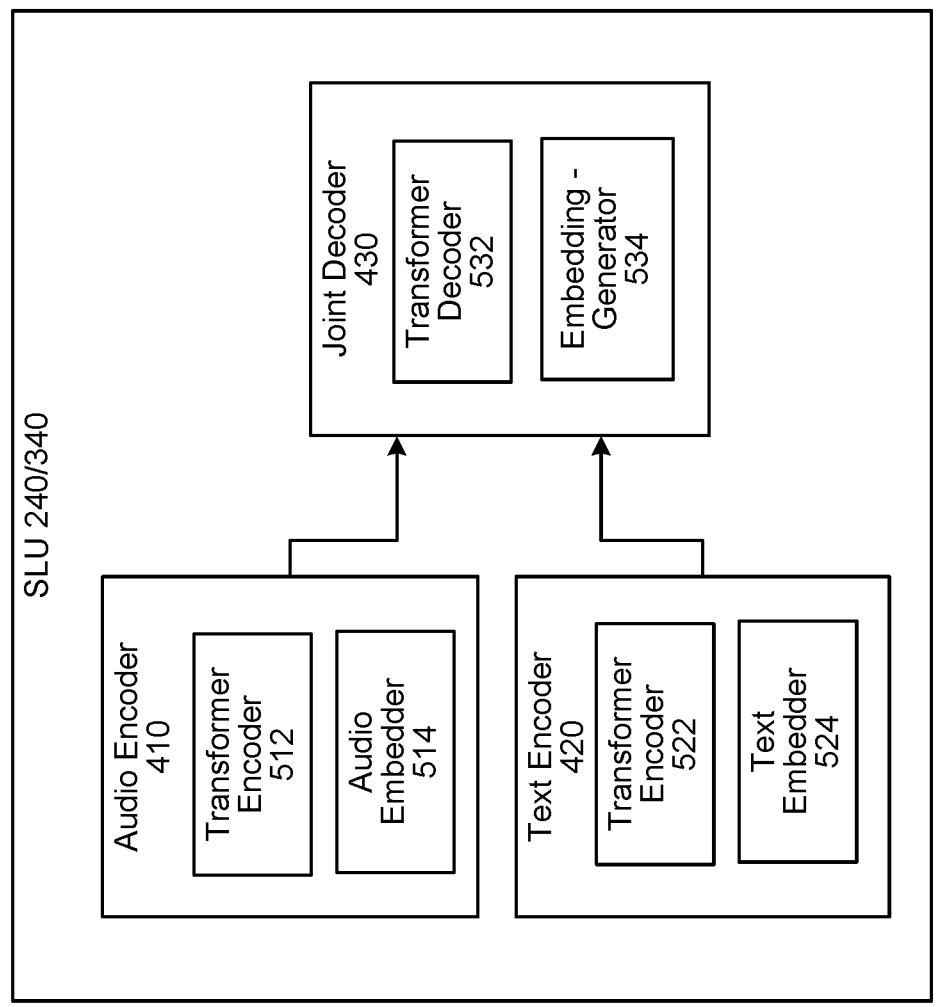

SPEECH PROCESSING

BACKGROUND

Spoken language processing systems have progressed to the point where humans can interact with and control computing devices using their voices. Such systems employ techniques to identify the words spoken by a user based on the various characteristics of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system configured to process input audio data using a SLU component, according to embodiments of the present disclosure.

FIG. 2 is a conceptual diagram of components of a system, according to embodiments of the present disclosure.

FIG. 3 is a conceptual diagram of components of a device, according to embodiments of the present disclosure.

FIG. 5 is a conceptual diagram of example components of an audio encoder, a text encoder, and a joint decoder of the SLU component, according to embodiments of the present disclosure.

DETAILED DESCRIPTION

Figure 1B:
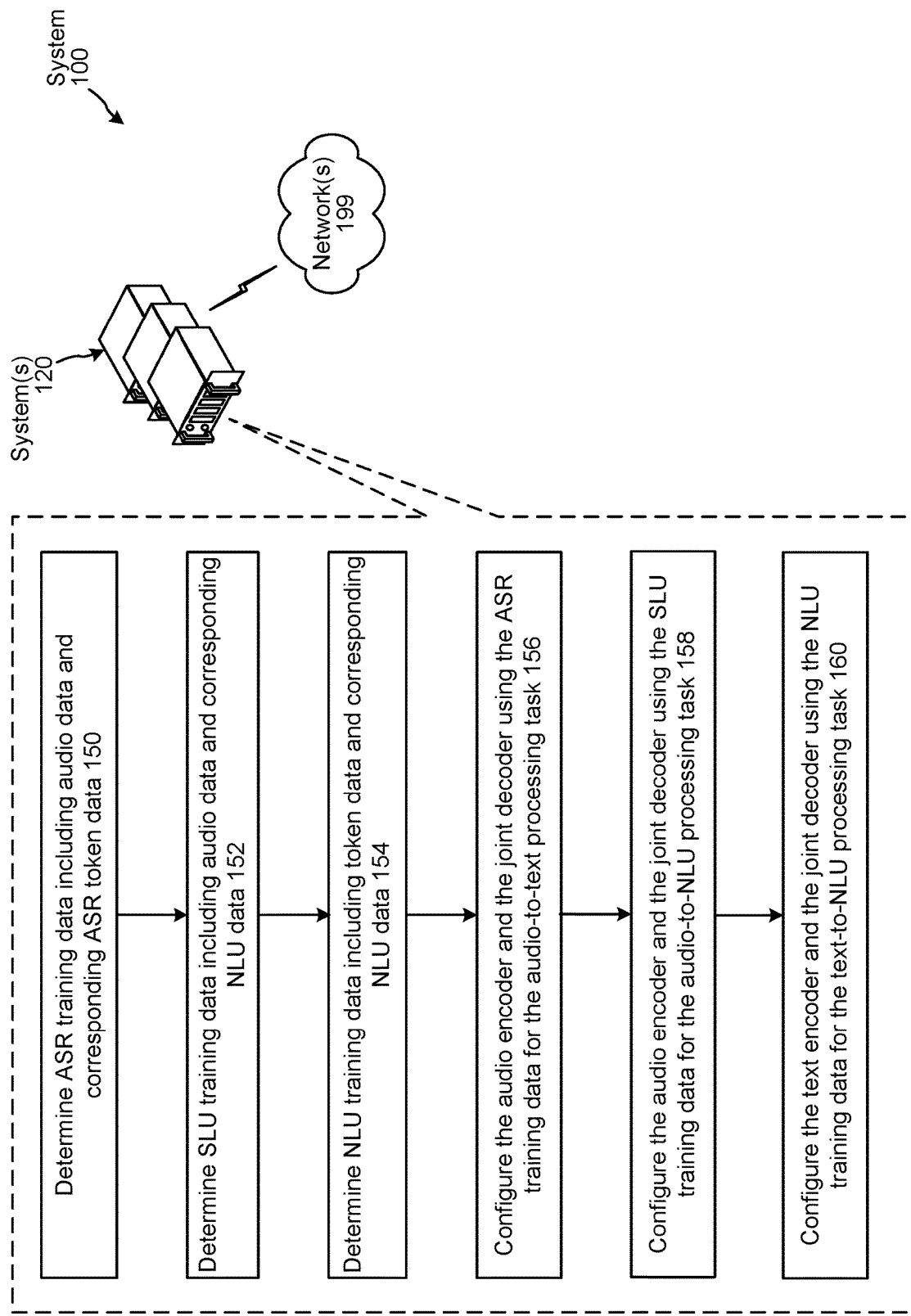
FIG. 1B is a conceptual diagram illustrating a system to configure a SLU component to perform different processing tasks, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs or other types of inputs). NLU often involves processing ASR output data to derive meaning from spoken inputs. Spoken language understanding (SLU) refers to deriving meaning directly from audio data representing speech. ASR and NLU may be collectively referred to as spoken language understanding (SLU). Text-to-speech (TTS) is a field of computer science concerning transforming textual and/or other data into audio data that is synthesized to resemble human speech.

A speech processing system may use a two-stage pipeline—first an ASR component to process spoken inputs and generate text transcriptions, followed by a NLU component to associate the transcriptions to actionable hypotheses representing one or more intents of the input and/or entities indicated in the input. A speech processing system may additionally or alternatively implement an end-to-end SLU component that may directly determine a NLU hypothesis from speech. In some cases, there may be a lack of or otherwise relatively low amount of training data, including audio data representing spoken inputs and annotation data representing the intents and entities in the audio data, for configuring the SLU component.

The present disclosure relates to techniques for configuring a SLU component using different types of data, including ASR training data, NLU training data and SLU training data. As used herein, ASR training data refers to data used to configure an ASR component to process spoken inputs and generate text transcriptions, while NLU training data refers to data used to configure an NLU component to process text transcriptions and generate NLU hypotheses representing intents, and if applicable entities. As used herein, SLU training data refers to audio data, representing spoken inputs, annotated for intents and entities represented in the spoken inputs. The SLU component of the present disclosure may be jointly trained on multiple processing tasks, such as an audio-to-text processing task (e.g., ASR processing; may also be referred to as audio-to-token processing task), a text-to-NLU processing task (e.g., NLU processing; may also be referred to as token-to-NLU processing task), and an audio-to-NLU processing task (e.g., SLU processing).

In some embodiments, the SLU system includes an audio encoder configured for the audio-to-text processing task and the audio-to-NLU processing task, a text encoder configured for the text-to-NLU processing task, and a joint decoder configured for all three processing tasks.

In some embodiments, the SLU system may be pre-trained using the ASR training data and the NLU training data because of the availability of such training data, then the SLU system may be fine-tuned using the SLU training data.

In some embodiments, the techniques of the present disclosure can also be used to configure the SLU system for new domains, new intents, and/or new entities. For example, the SLU system can be pre-trained using ASR training data and NLU training data representing the new domains, new intents, and/or new entities, and then fine-tuned using SLU training data for the new domains, new intents, and/or new entities.

A "domain" may include various skills relating to a particular area of interest. For example, a music domain may include various skills that can respond to a user's request to play music, enable a user to purchase music, etc. In another example, a smart-home domain may include skills that enable a user to control various home devices. An intent corresponds to what the user desires a system to do in response to an input (e.g., a spoken input, a text input, or other forms of inputs that can have a natural language meaning). The intent may be represented by a particular action that the system (either alone or in conjunction with other components, such as skills) can perform. For example, a system may determine an input of "play [artist]" potentially relates to a <PlayMusic> intent and a <PlayVideo> intent, since the input may correspond to a request to play music by the artist or a request to play a music video by the artist. An entity is a person, place, thing, etc. that has an identity. In order to perform the action indicated by the user input the system identifies the entity (or entities) in the user input. The system may also identify the entity type. For example, a system may determine the input of "play [artist]" potentially includes an entity type <artist> and an entity value "artist."

As used herein, a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill may output music sung by the indicated artist. For further example, for the spoken natural language input "turn on the lights," a skill may cause one or more "smart" lights to operate in an "on" state. In another example, for the spoken natural language input "what is the weather," a skill may output weather information for a geographic location corresponding to the device that captured the spoken natural language input. What is described herein as a skill may be referred to using different terms, such as an application, a processing component, a content/music service provider, a content/music provider, or the like.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A shows a system 100 configured to process input audio data using a SLU component. Although the figures and discussion of the present disclosure illustrate certain steps in a particular order, the described steps may be performed in a different order (as well as certain steps removed or added) without departing from the present disclosure. As shown in FIG. 1A, the system 100 may include a device 110 (local to a user 5) in communication with a system(s) 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system(s) 120 generates (128) a SLU component (e.g., SLU component 240/340), where the SLU component includes an audio encoder configured to perform an audio-to-text processing task and an audio-to-NLU processing task, a text encoder configured to perform a text-to-NLU processing task, and a joint decoder configured to perform the audio-to-text processing task, the audio-to-NLU processing task and the text-to-NLU processing task. The SLU component may be configured as described in relation to FIGS. 1B, 4 and 5. The audio encoder may be configured for the audio-to-text processing task, which may also be referred to as an ASR processing task, where audio data, representing speech, is processed to determine token data representing a transcription of the speech. The audio encoder may also be configured for the audio-to-NLU processing task, which may also be referred to as an SLU processing task, where audio data, representing a natural language input is processed to determine an intent of the natural language input, one or more entity types and one or more entity values represented in the natural language input. The text encoder may be configured for the text-to-NLU processing task, which may also be referred to an NLU processing task, where token data, representing a natural language input, is processed to determine an intent of the natural language input, one or more entity types and one or more entity values represented in the natural language input. The joint decoder of the SLU component may be configured for the audio-to-text processing task, the audio-to-NLU processing task and the text-to-NLU processing task. As such, the SLU component may be configured to process audio inputs and text inputs via the joint decoder. The audio encoder, the text encoder and the joint decoder may include one or more machine learning algorithms.

As used herein, "text", "text data" "token", "token data" and "ASR token data" may include any representation of one or more words/subwords/phonemes, including language-generic words/subwords/phonemes and/or word meanings (e.g., different set of symbols/digital representation of homonyms). Text data may be an example of token data processed by the system as described herein.

The system(s) 120 receives (130) input audio data representing a spoken input. The input audio data may represent an input spoken by the user 5 and captured by the device 110, thus, the input audio data may be received from the device 110. In other cases, the input audio data may be received from another component, another device or another system. In some embodiments, the system(s) 120 may process the input audio data to determine log filterbank (LBF) features to be processed by a SLU component described below.

The system(s) 120 processes (132) the input audio data using the SLU component (e.g., SLU component 240/340) as determined in step 128. In some embodiments, the first input audio data may be processed using the audio encoder of the SLU component and the joint decoder of the SLU component. For example, the audio encoder may process the input audio data to generate output data, this output data may be processed by the joint decoder to generate NLU data corresponding to the input audio data.

The system(s) 120 determines (134) NLU data corresponding to the input audio data. The NLU data represents an intent corresponding to the spoken input/input audio data. The NLU data, in some embodiments, may also include one or more entities and one or more entity types represented in the spoken input, if any entities are included in the spoken input. In some embodiments, the NLU data may also include a domain corresponding to the input audio data. In some embodiments, the input audio data may be processed by the audio encoder and the joint decoder to perform SLU processing and to determine the NLU data corresponding to the input audio data. In some embodiments, the NLU data may include a NLU hypothesis including an intent, and if applicable, an entity(ies) and an entity type(s), and a score. In some embodiments, the NLU data may include a N-best list of NLU hypotheses.

The system(s) 120 determines (136), using the NLU data, output data responsive to the spoken input. The system(s) 120 may send the NLU data to one or more other processing components (e.g., one or more skill components 225). For example, if the spoken input is "play [song] by [artist]" then the NLU data may include an intent: <PlayMusic>; entity type: <song>, entity value: "song"; entity type: <artist>, entity value: "artist." The NLU data may also include domain: Music. The system(s) 120 may send the NLU data to a skill component capable of outputting music, and the skill component may identify the song indicated in the spoken input. Output data (e.g., audio data) representing the song may be outputted to the user 5 via the device 110.

FIG. 1B shows a system 100 to configure the SLU component for multiple processing tasks. The steps described in relation to FIG. 1B may be training steps performed prior to receiving the input audio data in step 130. The steps of FIG. 1B may be performed at the same system(s) 120 or may be performed at a different system(s) or a device 110 (e.g., a desktop computer).

The system(s) 120 determines (150) ASR training data including audio data and corresponding ASR token data. The ASR training data may include multiple pieces of audio data representing spoken inputs, each audio data may be annotated with its corresponding ASR token data. ASR token data may correspond to words/subwords represented in the audio data. The ASR training data may be used in the industry to train/configure ASR components to perform ASR processing.

The system(s) 120 determines (152) SLU training data including audio data and corresponding NLU data. The SLU training data may include multiple pieces of audio data representing spoken natural language inputs, each audio data may be annotated with its corresponding NLU data. NLU data may include an intent(s) corresponding to the spoken natural language input, and if applicable, an entity type(s) represented in the spoken natural language input and an entity value(s) represented in the spoken natural language input. The SLU training data may be used in the industry to train/configure SLU components to perform SLU processing.

The system(s) 120 determines (154) NLU training data including ASR token data and corresponding NLU data. The NLU training data may include multiple pieces of token data representing natural language inputs, each token data may be annotated with its corresponding NLU data. NLU data may include an intent(s) corresponding to the natural language input, and if applicable, an entity type(s) represented in the natural language input and an entity value(s) represented in the natural language input. The NLU training data may be used in the industry to train/configure NLU components to perform NLU processing.

The system(s) 120 configures (156) the audio encoder and the joint decoder using the ASR training data for the audio-to-text processing task. The system(s) 120 may train an (first) encoder and a (first) decoder using the ASR training data to perform ASR processing. The ASR training data may be a dataset including multiple audio data representing multiple speech inputs. Each audio data in the ASR training data may be labeled/associated with corresponding token data indicating the words/subwords/phonemes represented in the audio data. For example, first data in the ASR training data may be first audio data and first token data "play [song] by the [artist]." In another example, second data in the ASR training data may be second audio data and second token data "turn on the lights." The ASR training data may represent annotated speech-to-text data (i.e. speech data annotated with ASR labels). After the audio encoder and the joint decoder are trained using the ASR training data, the audio encoder may be configured to process input audio data and the joint decoder may be configured to output token data representing the words/subwords/phonemes in the input audio data.

The system(s) 120 configures (158) the audio encoder and the joint decoder using the SLU training data for the audio-to-NLU processing task. The system(s) 120 may train the first encoder and the first decoder (that have been configured for ASR processing) using the SLU training data to determine a second encoder and a second decoder trained to perform SLU processing and ASR processing. The SLU training data may be a dataset including multiple audio data representing multiple speech inputs. Each audio data in the SLU training data may be labeled with an intent(s), and (optionally) portions of the audio data may be labeled with an entity type(s), and an entity value(s) represented in the audio data. For example, first data in the SLU training data may include first audio data representing the speech input "play [song] by [artist]", and the first data may also include first intent data: <PlayMusic>, first entity type: <song>, first entity value: "song", second entity type: <artist>, and second entity value: "artist". In another example, second data in the SLU training data may include second audio data representing the speech input "turn on the lights", and the second data may include second intent data: <TurnOn>, third entity type: <device> and third entity value: "lights." In some embodiments, the SLU training data may also include a domain associated with the speech input. Continuing with the foregoing example, the first data may further include domain: <Music>, and the second data may further include domain: <SmartHome>. The SLU training data may represent annotated speech-to-NLU data (i.e. speech data annotated with NLU labels). After the audio encoder and the joint decoder are trained using the SLU training data, the audio encoder may be configured to process input audio data and the joint decoder may be configured to output NLU data representing an intent(s) corresponding to the input audio data, and if applicable, an entity(ies) and entity type(s) represented in the input audio data.

The system(s) 120 configures (160) the text encoder and the joint decoder using the NLU training data for the text-to-NLU processing task. The system(s) 120 may train a separate third encoder and the second decoder (that has been configured for SLU processing and ASR processing) using the NLU training data to determine a fourth encoder and a third decoder trained to perform NLU processing, SLU processing and ASR processing. The NLU training data may be a dataset including multiple pieces of token data representing multiple natural language inputs. Each token data in the NLU training data may be labeled with an intent(s), and (optionally) portions of the token data may be labeled with an entity type(s), and an entity value(s). For example, first data in the NLU training data may include first token data representing the input "play [song] by [artist]", and the first data may include first intent data: <PlayMusic>, first entity type: <song>, first entity value: "song", second entity type: <artist>, and second entity value: "artist". In another example, second data in the NLU training data ay include second token data representing the input "turn on the lights", and the second data may include second intent data: <TurnOn>, third entity type: <device> and third entity value: "lights." In some embodiments, the NLU training data may also include a domain associated with the natural language input. Continuing with the foregoing example, the first data may further include domain: <Music>, and the second data may further include domain: <SmartHome>. The NLU training data may represent annotated text-to-NLU data (i.e. token data annotated with NLU labels). After the text encoder and the joint decoder are trained using the NLU training data, the text encoder may be configured to process input token data and the joint decoder may be configured to output NLU data representing an intent(s) corresponding to the input token data, and if applicable, an entity(ies) and entity type(s) represented in the input token data.

The second encoder may be stored/used as the audio encoder of the SLU component, the fourth encoder may be stored/used as the text encoder of the SLU component, and the third decoder may be stored/used as the joint decoder of the SLU component.

In some embodiments, the audio encoder, the text encoder and the joint decoder may be configured for the various tasks in a different order. For example, the audio encoder and the joint decoder may be configured for SLU processing first, then ASR processing. In another example, the text encoder and the joint decoder may be configured for NLU processing, and then the audio encoder and the joint decoder may be configured for ASR processing and SLU processing.

The system 100 may operate using various components as illustrated in FIG. 2. The various components may be located on a same or different physical devices. Communication between various components may occur directly or across a network(s) 199.

A microphone or array of microphones (of or otherwise associated with the speech controllable device 110) may capture audio 11. The speech controllable device 110 processes audio data, representing the audio 11, to determine whether speech is detected. The speech controllable device 110 may use various techniques to determine whether audio data includes speech. In some examples, the speech controllable device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the speech controllable device 110 may implement a classifier configured to distinguish speech from background noise. The classifier may be implemented by techniques such as linear classifiers, support vector machines, and decision trees. In still other examples, the speech controllable device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the speech controllable device 110 may determine if the speech is directed at the speech controllable device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the speech controllable device 110 may "wake" and begin transmitting audio data 211, representing the audio 11, to the system 120. The audio data 211 may include data corresponding to the detected wakeword, or the speech controllable device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an SLU component 240.

The SLU component 240 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The SLU component 240 interprets the speech in the audio data 211 based on a similarity between the audio data 211 and pre-established language models. For example, the SLU component 240 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language input. The device 110 may determine text data 213 representing the typed natural language input, and may send the text data 213 to the system 120, wherein the text data 213 is received by the orchestrator component 230. The orchestrator component 230 may process the text data 213 or the ASR output data to determine NLU data.

The SLU component 240 processes the ASR output data or token data to determine one or more NLU hypotheses embodied in NLU output data. The SLU component 240 may perform intent classification (IC) processing on the ASR output data or token data to determine an intent of the natural language user input. An intent corresponds to an action to be performed that is responsive to the natural language user input. To perform IC processing, the SLU component 240 may communicate with a database of words linked to intents. For example, a music intent database may link words and phrases such as "quiet," "volume off," and "mute" to a <Mute> intent. The SLU component 240 identifies potential intents by comparing words and phrases in ASR output data or token data to the words and phrases in an intents database. In at least some embodiments, the SLU component 240 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The SLU component 240 may also perform named entity recognition (NER) processing on the ASR output data or token data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the SLU component 240 may be linked to one or more grammar frameworks with "slots" to be filled. Each slot of a grammar framework corresponds to a portion of ASR output data or token data that the SLU component 240 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the SLU component 240 may perform NER processing to identify words in ASR output data or token data as subject, object, verb, preposition, etc. based on grammar rules and/or models. Then, the SLU component 240 may perform IC processing that involves using the identified verb to identify an intent. Thereafter, the SLU component 240 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or token data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or token data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The SLU component 240 may generate NLU output data including one or more NLU hypotheses, with each NLU hypothesis including the intent and slot(s) determined from IC processing and NER processing of the ASR output data or token data. In at least some embodiments, the SLU component 240 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or token data with respect to a different skill.

In some embodiments, the SLU component 240 may be equivalent to a combination of an ASR component and an NLU component. In some embodiments, the SLU component 240 may process audio data 211 and directly determine the NLU output data, without an intermediate step of generating ASR output data. As such, the SLU component 240 may take audio data 211 representing speech and make a semantic interpretation of the speech. That is, the SLU component 240 may determine a meaning associated with the speech and then implement that meaning. For example, the SLU component 240 may interpret audio data 211 representing speech from the user 5 in order to derive a desired action. The SLU component 240 may output a most likely NLU hypothesis, or multiple NLU hypotheses associated with respective confidence or other scores (such as probability scores, etc.).

The SLU component 240 may send the NLU output data to the orchestrator component 230. The orchestrator component 230 may send the NLU output data to a skill.

The system(s) 120 may include or otherwise communicate with one or more skills 225. As mentioned herein above, as used herein a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill 225 may output music sung by the indicated artist. For further example, for the spoken natural language input "turn on the lights," a skill 225 may cause one or more "smart" lights to operate in an "on" state. In another example, for the spoken natural language input "what is the weather," a skill 225 may output weather information for a geographic location corresponding to the device that captured the spoken natural language input. What is described herein as a skill 225 may be referred to using different terms, such as an action, bot, application, or the like. Inputs to a skill 225 may come from speech processing interactions or through other interactions or input sources.

A skill 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data or token data using one or more different methods. Text data or token data input to the TTS component 280 may come from a skill, the orchestrator component 230, or another component of the system 120.

In one method of synthesis called unit selection, the TTS component 280 matches text data or token data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system(s) 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the speech controllable device 110 that determined the audio data 211). The user recognition component 295 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the speech controllable device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the speech controllable device 110 that determined the audio data 211 or otherwise captured a user input). The user recognition component 295 may perform other or additional user recognition processes, including those known in the art. For a particular user input, the user recognition component 295 may perform processing with respect to stored data of users associated with the speech controllable device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The foregoing describes illustrative components and processing of the system(s) 120. The following describes illustrative components and processing of the speech controllable device 110. As illustrated in FIG. 3, in at least some embodiments, the system 120 may receive the audio data 211 from the speech controllable device 110, to recognize speech corresponding to a spoken input in the received audio data 211, and to perform functions in response to the recognized speech. In at least some embodiments, these functions involve sending directives (e.g., commands), from the system 120 to the speech controllable device 110 (and/or other devices 110) to cause the speech controllable device 110 to perform an action, such as output an audible response to the spoken input via a loudspeaker(s), and/or control secondary devices in the environment by sending a control command to the secondary devices.

Thus, when the speech controllable device 110 is able to communicate with the system 120 over the network(s) 199, some or all of the functions capable of being performed by the system 120 may be performed by sending one or more directives over the network(s) 199 to the speech controllable device 110, which, in turn, may process the directive(s) and perform one or more corresponding actions. For example, the system 120, using a remote directive that is included in response data (e.g., a remote response), may instruct the speech controllable device 110 to output an audible response (e.g., using TTS processing performed by an on-device TTS component 380) to a user's question via a loudspeaker(s) of (or otherwise associated with) the speech controllable device 110, to output content (e.g., music) via the loudspeaker(s) of (or otherwise associated with) the speech controllable device 110, to display content on a display of (or otherwise associated with) the speech controllable device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the speech controllable device 110 may include a wakeword detection component 220 configured to compare the audio data 211 to stored models used to detect a wakeword (e.g., "Alexa") that indicates to the speech controllable device 110 that the audio data 211 is to be processed for determining NLU output data (e.g., slot data that corresponds to a named entity, label data, and/or intent data, etc.). In at least some embodiments, a hybrid selector 324, of the speech controllable device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device SLU component 340. The wakeword detection component 220 may also send an indication, to the hybrid selector 324, representing a wakeword was not detected. In response to receiving such an indication, the hybrid selector 324 may refrain from sending the audio data 211 to the system 120, and may prevent the SLU component 340 from further processing the audio data 211. In this situation, the audio data 211 can be discarded.

The device 110 may conduct its own speech processing using on-device language processing components, such as an SLU component 340, similar to the manner discussed above with respect to the SLU component 240 of the system(s) 120. The device 110 may also internally include, or otherwise have access to, other components such as one or more skills 325 capable of executing commands based on NLU output data or other results determined by the speech controllable device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), and other components. In at least some embodiments, the profile storage 370 may only store profile data for a user or group of users specifically associated with the speech controllable device 110.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the speech controllable device 110 attempts to process a natural language input for which the on-device language processing components are not necessarily best suited, the language processing results determined by the speech controllable device 110 may indicate a low confidence or other metric indicating that the processing by the speech controllable device 110 may not be as accurate as the processing done by the system 120.

The hybrid selector 324, of the speech controllable device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the SLU component 340 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the speech controllable device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device SLU component 340 by routing the audio data 211 through the HEC 327 of the hybrid selector 324, whereby the LRO 328 notifies the SLU component 340 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device SLU component 340 without departing from the disclosure. For example, the speech controllable device 110 may process the audio data 211 on-device without sending the audio data 211 to the system 120.

The on-device SLU component 340 is configured to receive the audio data 211 from the hybrid selector 324, and to recognize speech in the audio data 211, and is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

A NLU hypothesis (output by the SLU component 340) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the speech controllable device 110 is able to access the system 120 over the network(s) 199), or to determine output audio requesting additional information from the user 5.

The speech controllable device 110 and/or the system 120 may associate a unique identifier with each natural language input. The speech controllable device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skills 325 that may work similarly to the skill(s) 225. The skill(s) 325 may correspond to one or more domains that are used in order to determine how to act on a spoken input in a particular way, such as by outputting a directive that corresponds to the determined intent, and which can be processed to implement the desired operation. The skill(s) 325 installed on (or in communication with) the device 110 may include, without limitation, a content service provider skill, a smart home skill (or smart home domain) and/or a device control skill (or device control domain) to execute in response to spoken inputs corresponding to an intent to control a second device(s) in an environment, a music skill (or music domain) to execute in response to spoken inputs corresponding to a intent to play music, a navigation skill (or a navigation domain) to execute in response to spoken input corresponding to an intent to get directions, a shopping skill (or shopping domain) to execute in response to spoken inputs corresponding to an intent to buy an item from an electronic marketplace, and/or the like.

In at least some embodiments, some or all of the functionality, described herein as being provided by the system 120, may instead by provided by the device 110.

Various machine learning techniques may be used to train and operate machine learning models to perform various steps described herein, such as ASR processing, NLU processing, SLU processing, user recognition, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The SLU component 240/340 may be trained using transfer learning techniques. The SLU component 240/340 may be a transformer-based model that is jointly trained on multiple audio-to-text and text-to-NLU processing tasks. Examples of such processing tasks include speech recognition (ASR processing), NLU hypothesis prediction from speech (SLU processing), masked language model (LM) prediction (MLM processing), and NLU hypothesis prediction from text (NLU processing). The SLU component 240/340 may achieve this by converting data from all these processing tasks into a single audio-to-text, audio-to-NLU, or text-to-NLU format. Knowledge transfer within the machine learning models of the SLU component 240/340 may take place by training on the multiple processing tasks, which in turn may help in the SLU component 240/340 in performing SLU processing.

Figure 4A:
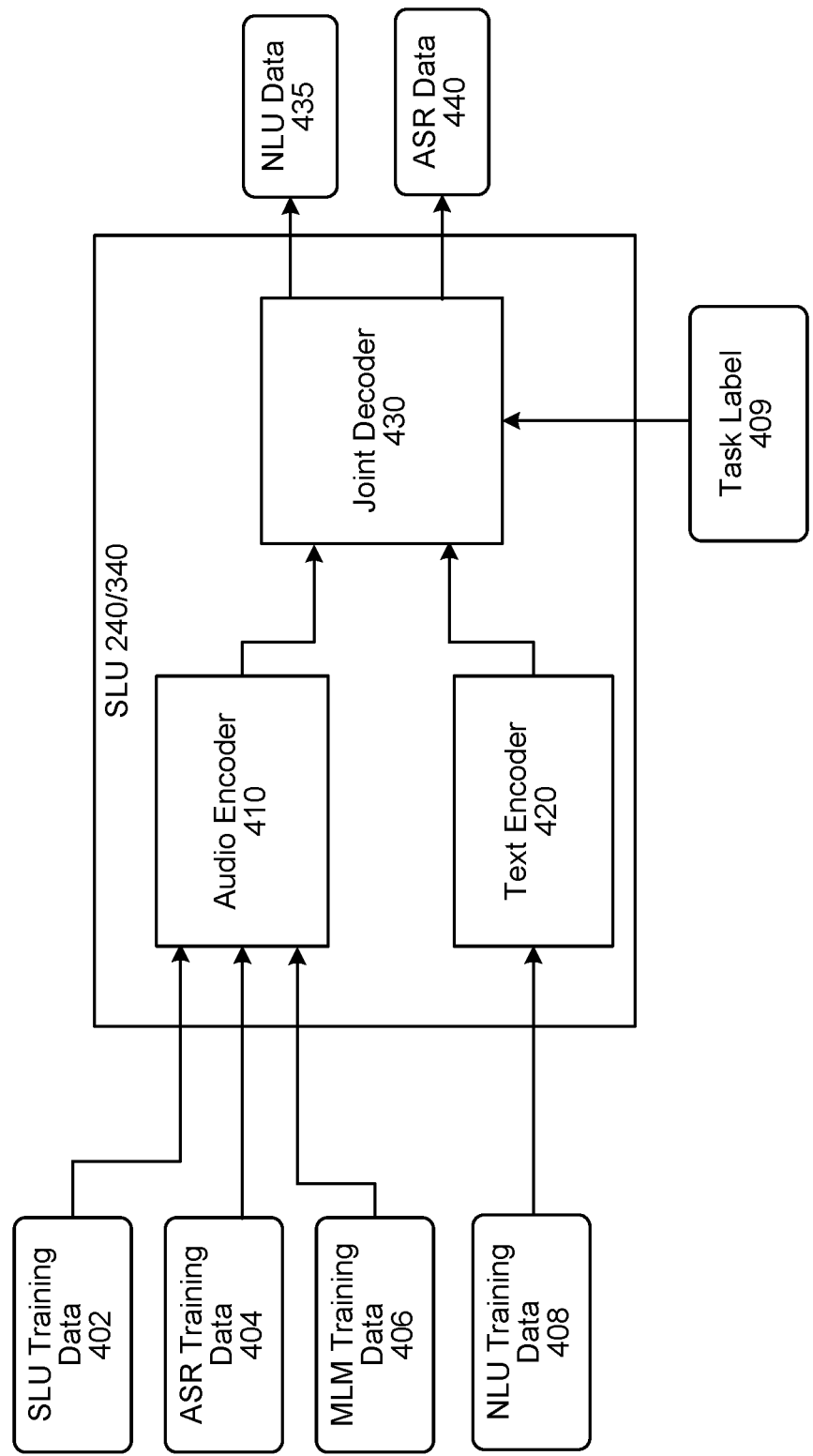
FIG. 4A is a conceptual diagram of a SLU component being configured, during a pre-training stage, using different types of training data for different types of tasks, according to embodiments of the present disclosure.

The SLU component 240/340, in some embodiments, includes two encoders—an audio encoder and a text encoder—each configured for different processing tasks, and a joint decoder configured for all of the processing tasks. FIG. 4A is a conceptual diagram of the SLU component 240/340 being configured, during a pre-training stage, using different types of training data for different types of processing tasks. The audio encoder 410 may be configured for an audio-to-text processing task, where the audio encoder 410 processes audio data (e.g., representing speech) to output encoded audio data that may be processed by the joint decoder 430 to generate ASR token data corresponding to the audio data. The audio encoder 410 may also be configured for an audio-to-NLU processing task, where the audio encoder 410 processes audio data (e.g., representing speech) to output encoded audio data that may be processed by the joint decoder 430 to generate NLU data corresponding to the audio data. The text encoder 420 may be configured for a text-to-NLU processing task, where the text encoder 420 processes token data (e.g., corresponding to a text-based natural language input or ASR output/token data) to output encoded token data that may be processed by the joint decoder 430 to generate NLU data corresponding to the token data. To configure the audio encoder 410, the text encoder 420 and the joint decoder 430, different types of training data may be used, including, but not limited to SLU training data 402, ASR training data 404, masked language model (MLM) training data 406, and NLU training data 408.

By comprising both the text encoder 420 and the audio encoder 410, the SLU component 240/340 is able to consume both audio and text inputs to generate NLU data. By jointly training on both audio-to-NLU and text-to-NLU processing tasks, the SLU component 240/340 may learn a shared representation for both audio and text inputs, which may allow training, for example, on new text-to-NLU data (corresponding to new domains, new intents, and/or new entities) and get audio-to-NLU processing task performance from the SLU component 240/340.

In some embodiments, the SLU training data 402 may be a dataset including multiple audio data representing multiple speech inputs. Each audio data in the SLU training data 402 may be labeled with an intent(s), and (optionally) portions of the audio data may be labeled with an entity type(s), and an entity value(s) represented in the audio data. For example, first data in the SLU training data 402 may include first audio data representing the speech input "play [song] by [artist]", and the first data may include first intent data: <PlayMusic>, first entity type: <song>, first entity value: "song", second entity type: <artist>, and second entity value: "artist". In another example, second data in the SLU training data 402 may include second audio data representing the speech input "turn on the lights", and the second data may include second intent data: <TurnOn>, third entity type: <device> and third entity value: "lights." In some embodiments, the SLU training data 402 may also include a domain associated with the speech input. Continuing with the foregoing example, the first data may further include domain: <Music>, and the second data may further include domain: <SmartHome>. The SLU training data 402 may represent annotated speech-to-NLU data (i.e. speech data annotated with NLU labels).

The ASR training data 404 may be a dataset including multiple audio data representing multiple speech inputs. Each audio data in the ASR training data 404 may be labeled/associated with corresponding ASR token data indicating the words/subwords represented in the audio data. For example, first data in the ASR training data 404 may be first audio data and first ASR token data "play [song] by the [artist]." In another example, second data in the ASR training data 404 may be second audio data and second ASR token data "turn on the lights." The ASR training data 404 may represent annotated speech-to-text data (i.e. speech data annotated with ASR labels).

The MLM training data 406 may be a dataset including multiple audio data representing multiple speech inputs, where portions of the audio data are masked/obscured. Each audio data in the MLM training data 406 may be labeled/associated with correspond ASR token data indicating the words/subwords represented in the unmasked portion of the audio data. For example, for a speech input "play [song] by the [artist]", first data in the MLM training data 406 may be audio data representing "<blank>[song] by the [artist]" (where the audio data representing "play" may be silenced/masked), and the first data may include first ASR token data "<blank>[song] by the [artist]." In another example, for a speech input "turn on the lights", second data in the MLM training data 406 may be audio data representing "<blank> on the lights" (where the audio data representing "turn" may be silenced/masked), and the second data may include second ASR token data "<blank> on the lights." In yet another example, for a speech input "I like romantic movies with [actor]", third data in the MLM training data 406 may be audio data representing "I like romantic <blank> with [actor]" (where the audio data representing "movies" may be silenced/masked), and the third data may include third ASR token data "I like romantic <blank> with [actor]." The MLM training data 406 enables the audio encoder 410 to learn semantics of a language, by randomly masking some of the tokens/words and then requiring the SLU component 240/340 (via the audio encoder 410 and the joint decoder 430) to recover the complete sentence/speech input. Using the MLM training data 406, the SLU component 240/340 may perform a fill-in-the-blank task, where the SLU component 240/340 uses the context words surrounding the masked token to predict what the masked word should be.

The NLU training data 408 may be a dataset including multiple ASR token data representing multiple natural language inputs. Each ASR token data in the NLU training data 408 may be labeled with an intent(s), and (optionally) portions of the ASR token data may be labeled with an entity type(s), and an entity value(s). For example, first data in the NLU training data 408 may include first ASR token data representing the input "play [song] by [artist]", and the first data may include first intent data: <PlayMusic>, first entity type: <song>, first entity value: "song", second entity type: <artist>, and second entity value: "artist". In another example, second data in the NLU training data 408 may include second ASR token data representing the input "turn on the lights", and the second data may include second intent data: <TurnOn>, third entity type: <device> and third entity value: "lights." In some embodiments, the NLU training data 408 may also include a domain associated with the natural language input. Continuing with the foregoing example, the first data may further include domain: <Music>, and the second data may further include domain: <SmartHome>. The NLU training data 408 may represent annotated text-to-NLU data (i.e. text/ASR token data annotated with NLU labels).

In some embodiments, the audio encoder 410 and the joint decoder 430 may be trained using the SLU training data 402, the ASR training data 404 and the MLM training data 406, and the text encoder 410 and the joint decoder 430 may be trained using the NLU training data 408. During training, the joint decoder 430 may receive a task label 409 indicating which task the joint decoder is being trained for. For example, when the audio encoder 410 is processing the SLU training data 402, the task label 409 may be set to "SLU," indicating to the joint decoder 430 that the processing task is an audio-to-NLU processing task. When the audio encoder 410 is processing the ASR training data 404, the task label 409 may be set to "ASR," indicating to the joint decoder 430 that the processing task is an audio-to-text processing task. When the audio encoder 410 is processing the MLM training data 406, the task label 409 may be set to "MLM," indicating to the joint decoder 430 that the processing task is an audio-to-text processing task. When the text encoder 420 is processing the NLU training data 408, the task label 409 may be set to "NLU," indicating to the joint decoder 430 that the processing task is a text-to-NLU processing task (e.g., the input data processed by the text encoder 420 is token data). In other embodiments, the task label 409 may be a numerical value, for example, "1" may indicate the audio-to-NLU processing task, while "2" may indicate the audio-to-text processing task, and "3" may indicate the text-to-NLU processing task.

Based on the task label 409, the joint decoder 430 may perform the appropriate processing task and generate the appropriate output. The joint decoder 430 may generate NLU data 435 or ASR data 440 based on which processing task is performed. For example, for the audio-to-text processing task (using the ASR training data 404 or the MLM training data 406), the joint decoder 430 may generate the ASR data 440 including a text/token representation of the input audio data. In another example, for the audio-to-NLU processing task or the text-to-NLU processing task (using the SLU training data 402 or the NLU training data 408, respectively) the joint decoder 430 may generate the NLU data 435 including a NLU hypothesis corresponding to the audio data or the token data.

In some embodiments, the NLU data 435 and the ASR data 440 predicted by the joint decoder 430 may be used for configuring the SLU component 240/340. For example, the audio encoder 410, the text encoder 420 and the joint decoder 430 may be configured based on how accurate the NLU data 435 and the ASR data 440 prediction is. In another example, the NLU data 435 and the ASR data 440 may be used to train the SLU component 240/340 using backpropagation techniques employing an algorithm for supervised learning of neural networks using gradient descent, and given a neural network and an error function, the algorithm may calculate the gradient of the error function with respect to the neural network's weights.

In some embodiments, during the pre-training stage, the SLU component 240/340 may be trained for one processing task at a time. For example, during a first time period, the SLU component 240/340 may first process the SLU training data 402 and train on the audio-to-NLU processing task, where the task label 409 may be set to "SLU." During a second time period, the SLU component 240/340 may process the ASR training data 404 and train on the audio-to-text processing task, where the task label 409 may be set to "ASR." During a third time period, the SLU component 240/340 may process the MLM training data 406 and train on another audio-to-text processing task, where the task label 409 may be set to "MLM." During a fourth time period, the SLU component 240/340 may process the NLU training data 408 and train on the text-to-NLU processing task, where the task label 409 is set to "NLU."

When training, the input audio data may be pre-processed to obtain a sequence of log-filter bank (LFB) features, which is taken as the source sequence by the audio encoder 410. For processing tasks that take token data as input, the source sequence for the text encoder 420 may be the input tokens. The target sequence, outputted by the joint decoder 430, may be a sequence of tokens corresponding to the task being solved. The target sequence is a sequence of words if the processing task is audio-to-text (ASR processing). If the task is SLU processing or NLU processing, the target sequence consists of an intent(s) and (optionally) entity tags as well as the words within them In some embodiments, the task label 409 may be included as a beginning-of-sequence (BOS) token in the input data to the joint decoder 430. For example, while learning the audio-to-text processing task using the ASR training data 404, the task label 409 "ASR" may be added to the beginning of the output from the audio encoder 420 before the output from the audio encoder 420 is provided to the joint decoder 430. Similarly for the other tasks, the task label 409 may be added to the beginning of the output of the audio encoder 410 and the text encoder 420. In this way, the SLU component 240/340 can conditionally decode the target sequence based on the observed input and the task being solved.

The audio encoder 410, trained on the audio-to-text processing and audio-to-NLU processing tasks, presents a transfer learning advantage in SLU processing. The text encoder 420 enables adding of text-to-NLU processing tasks in the pre-training phase, and it also enables training on a task with only text-to-NLU training data and expect SLU processing by the component 240/340.

In some embodiments of the present disclosure, the hidden states from the audio input sequences and text input sequences are not single vectors, but sequences/sets of vectors, each of a different length and resolution. In some embodiments, these vectors may be pooled to get a single vector. In some embodiments, the architecture of the SLU component 240/340 avoids the explicit vector alignment, hence eliminating the need to pool the encoder hidden states. The SLU component 240/340 employs a single shared decoder 430 to process the hidden state vectors of both the audio encoder 410 and the text encoder 420. By constraining the complexity of the joint decoder 430, it is forced to learn a shared representation between the audio inputs and the text inputs so that the joint decoder 430 can perform the audio-to-NLU processing task (SLU processing), instead of solving the audio-to-text and text-to-NLU processing tasks (ASR and NLU processing) separately.

Figure 4B:
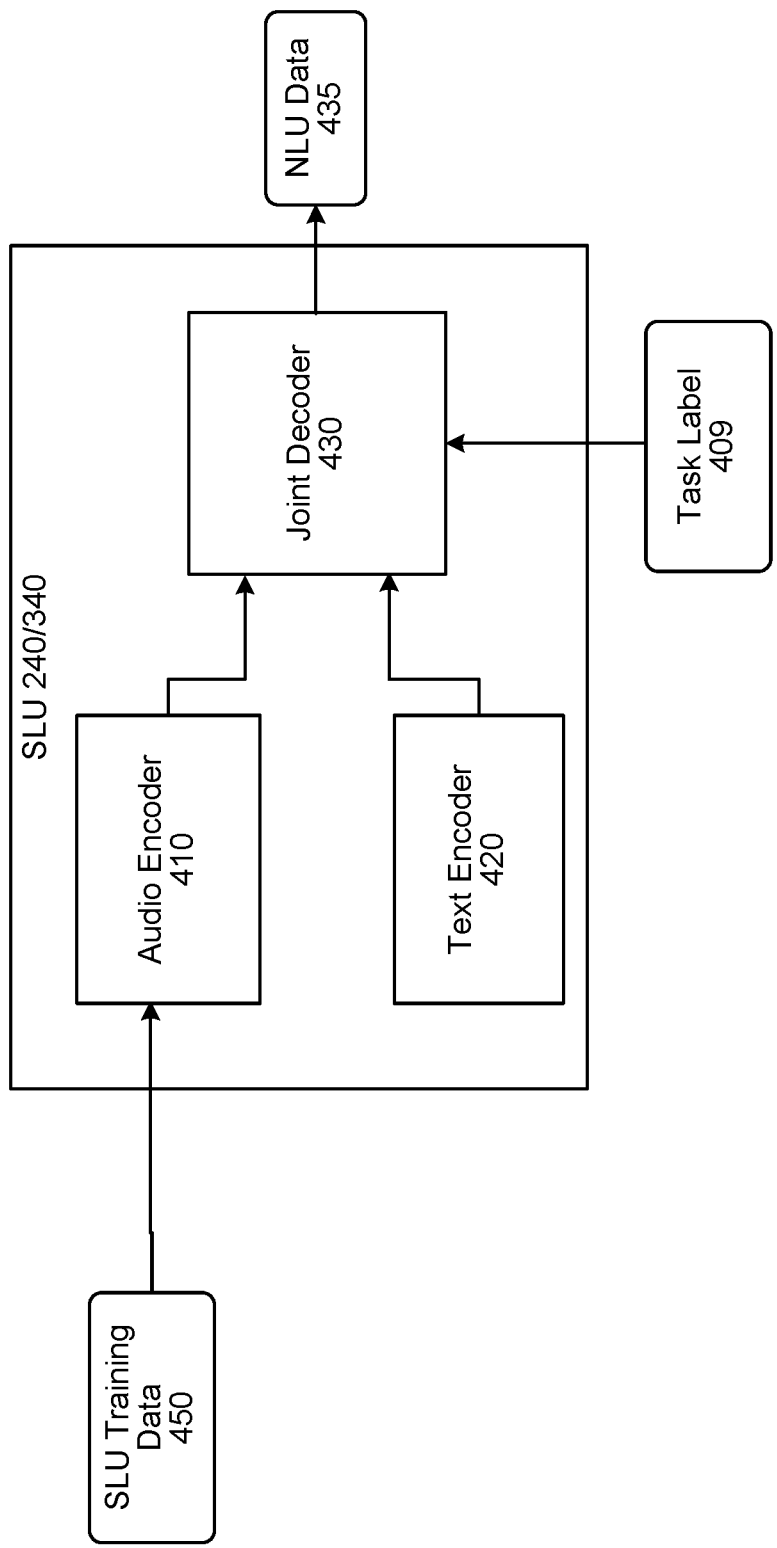
FIG. 4B is a conceptual diagram of the SLU component being configured, during a fine tuning stage, using SLU training data for an audio-to-text processing task, according to embodiments of the present disclosure.

In some embodiments, the configuration of the SLU component 240/340 may consist of two phases of training. First, in the pre-training phase (illustrated in FIG. 4A), the SLU component 240/340 may be trained on multiple audio-to-text, audio-to-NLU, and text-to-NLU processing tasks, using the SLU training data 402, the ASR training data 404, the MLM training data 406 and the NLU training data 408. After pre-training, in a fine-tuning phase, the SLU component 240/340 may be trained on a single downstream task with task-specific data (e.g., the audio-to-NLU processing task and SLU training data, the audio-to-text processing task and ASR training data, the text-to NLU processing task and NLU training data, or the audio-to-text processing task and MLM training data). FIG. 4B is a conceptual diagram of the SLU component 240/340 being configured, during a fine tuning stage, using SLU training data 450 for an audio-to-text processing task.

In the fine tuning stage, in some embodiments, the pre-trained SLU component 240/340 may be trained on a specific downstream task, such as SLU processing. Pre-training with multiple processing tasks may allow the SLU component 240/340 to transfer knowledge from different processing tasks, and obtain a start for optimization for the downstream task. In the fine-tuning phase, the pre-trained component is first trained by freezing all pre-trained parameters so that the newly initialized parameters get to a better optimization point. The parameters are then gradually unfrozen over time/iterations as the component is fine-tuned (as training batches/iterations continue).

The SLU component 240/340 has the ability to do zero-shot SLU processing by training on only annotated token data. This ability facilies feature expansion with respect to the SLU component 240/340, where new intents and entities need to be added to the machine learning models of the SLU component 240/340 without any annotated audio data (speech data) available.

In the zero shot scenario, a new annotated text-to-NLU dataset may be available, and the end-to-end SLU processing 240/340 may be desired to be able to process spoken inputs to determine corresponding NLU data in the new annotated text-to-NLU dataset. In some cases, in a feature expansion phase in voice assistants, a new domain (or intents or entities) is being added to the voice assistant's capabilities. For example, a voice assistant may be currently capable of handling user requests in music and shopping domains, and a capability for it to handle requests in a new domain such as books (e.g., reading a book, bookmarking a page, etc.) is to be added. In this case, developers may have some launch phrases, represented as token data, and may annotate the token data with an intent(s) and entity(ies) to perform a certain task in the new domain. Using the techniques described herein, the SLU component 240/340 can be configured to process audio data and generate the NLU hypothesis for the new domain by just training on the annotated token data.

The SLU component 240/340 configured using the techniques described herein allows for configuration of new domains, intents, and/or entities easily because it is pre-trained on processing tasks based on both audio inputs and text inputs. In the voice assistant feature expansion case for example, the pre-training phase may be carried out with an SLU processing task on existing domains, an NLU processing task on existing domains, and other processing tasks, such as the ASR processing and the MLM processing task. Once the pre-training phase is complete, the SLU component 240/340 may be fine-tuned using the annotated text NLU data for the new domain. The fine-tuned component can then be tested on input audio data received for the new domain during runtime.

In other embodiments, the SLU component 240/340 may be trained for a new domain, intent, and/or entity using synthetic audio data. The synthetic audio data may be generated using the TTS component 280/380. The TTS component 280/380 may be provided token data representing example inputs/phrases for the new domain, and the TTS component 280/380 may output audio data representing synthesized speech corresponding to the inputs/phrases. This audio data may be annotated with intents and entities, and may be used as the SLU training data for the new domain. In some embodiments, synthetic audio may be used as SLU training data during the pre-training phase. In other embodiments, the synthetic audio may be used as SLU training data during the fine-tuning phase.

FIG. 5 is a conceptual diagram of example components of the audio encoder 410, the text encoder 420, and the joint decoder 430 of the SLU component 240/340. In some embodiments, the audio encoder 410 may include an audio embedder 514 that may process audio data to generate feature vectors/embedding data representing features learned from the audio data. In some embodiments, the audio embedder 514 may include one or more convolutional layers and one or more max pooling layers to first contextually embed the audio log filter bank spectrogram derived from the input audio data. The output of the audio embedder 514 may be a set of audio feature vectors. In some embodiments, the audio encoder 410 may include a transformer encoder 512. The transformer encoder 512 may operate after the audio embedder 514, and may process the output of the audio embedder 514. The transformer encoder 512 may convert the audio feature vectors into a shorter sequence of hidden states to be processed by the joint decoder 430.

In some embodiments, the text encoder 420 may include a text embedder 524 that may process text data or token data to generate feature vectors/embedding data representing features (e.g., tokens representing words/subwords and their positions in the input text data) learned from the input text data or token data. In some embodiments, the text embedder 524 may be a bidirectional encoder representations from transformers (BERT) embedder. In some embodiments, the text encoder 420 may include a transformer encoder 522. The transformer encoder 522 may operate after the text embedder 524, and may process the output of the text embedder 524. The transformer encoder 522 may generate hidden states to be processed by the joint decoder 430. In some embodiments, the hidden states from the transformer encoder 522 may be larger in size than the hidden states from the transformer encoder 512, in which case, a projection layer may be employed to project the text encoder 420 hidden states down to match the dimensionality of the audio encoder 410 hidden states. In some embodiments, the projection layer may be employed to project the audio encoder 410 hidden states up to match the dimensionality of the text encoder 420 hidden states.

In some embodiments, the joint decoder 430 may include a transformer decoder 532, which may be configured to process the hidden states from the audio encoder 410 and the hidden states from the text encoder 420, and decode a target sequence. Both the text inputs and the audio inputs go through the same generation/decoding process, which allows the SLU component 240/340 to learn a shared representation without an explicit loss penalty to align them. In some embodiments, the joint decoder 430 may include an embedding-generator matrix 534, which may include the space from which the target sequence is to be generated from.

In some embodiments, the joint decoder 430 may use byte-pair encoding (BPE) to split the target words into smaller pieces. In some embodiments, only the target English words may be spilt, and not the tokens corresponding to the intent and entity tags if present in the data processed by the joint decoder 430. The target sequence tokens may be embedded using a standard embedding matrix. The transformer decoder 532 may then process the current token embedding and may perform a multi-head multi-layer attention over the encoder 410, 420 hidden states to generate a decoder hidden state. The decoder hidden state may be passed through a generator layer (in the transformer decoder 532) that shares weights with the embedding-generator matrix 534. The generator layer may assign a probability mass to each token in the target vocabulary, representing the probability of that token being generated next.

Figure 6:
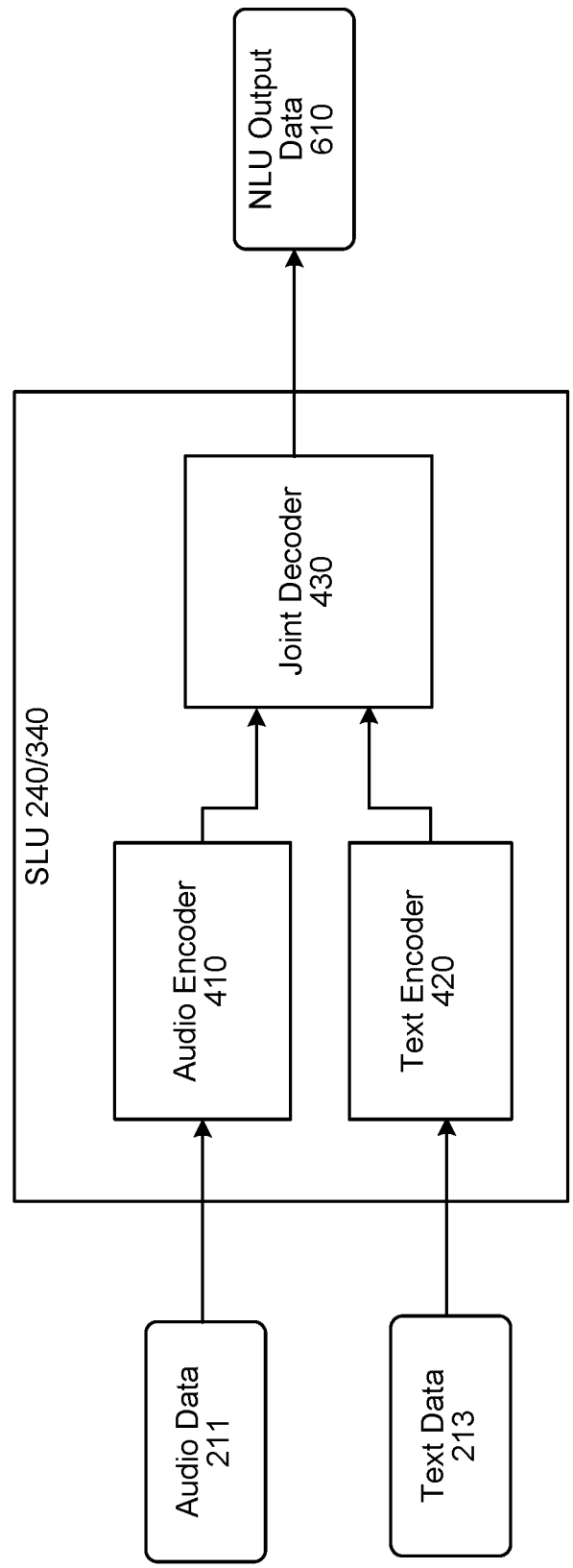
FIG. 6 is a conceptual diagram illustrating how the SLU component processes input audio data, according to embodiments of the present disclosure.

FIG. 6 is a conceptual diagram illustrating how the SLU component 240/340, configured as described in relation to FIG. 4, processes input audio data 211. The audio data 211 may be processed by the audio encoder 410 to generate audio feature vectors/embedding data representing features/characteristics for the audio data 211. In some embodiments, the output of the audio encoder 410 is hidden states of the encoder based on the processing of the audio data 211. In some embodiments, the audio data 211 is a log filterbank features spectrogram. The output of the audio encoder 410 may be processed by the joint decoder 430 to generate NLU output data 610. The NLU output data 610 may include an intent(s) corresponding to the audio data 211, one or more entity types represented in the audio data 211, and one or more entity values represented in the audio data 211. In some embodiments, the NLU output data 610 may also include a domain corresponding to the audio data 211.

In some embodiments, the system(s) 120 may receive input text data 213 representing a natural language input as described in relation to FIG. 2. In this case, the text data 213 may be processed by the text encoder 420 to generate text feature vectors/embedding data representing features/characteristics of the text data 213. In some embodiments, the output of the text encoder 420 is hidden states of the encoder based on the processing of the text data 213. The output of the text encoder 420 may be processed by the joint decoder 430 to generate NLU output data 610. In this case, the NLU output data 610 may include an intent(s) corresponding to the text data 213, one or more entity types represented in the text data 213, and one or more entity values represented in the text data 213. In some embodiments, the NLU output data 610 may also include a domain corresponding to the text data 213.

Figure 7:
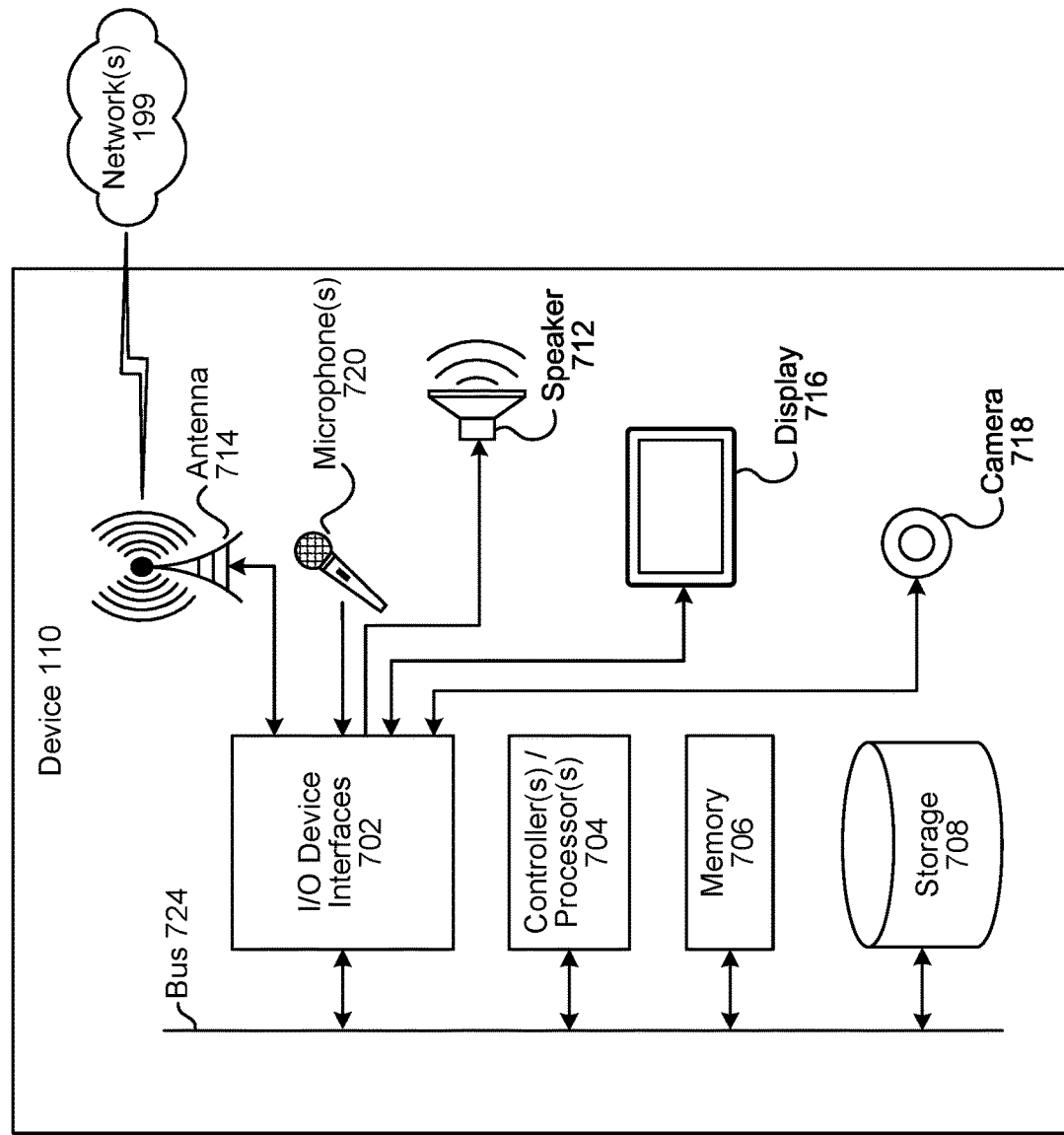
FIG. 7 is a block diagram conceptually illustrating example components of a device, according to embodiments of the present disclosure.
Figure 8:
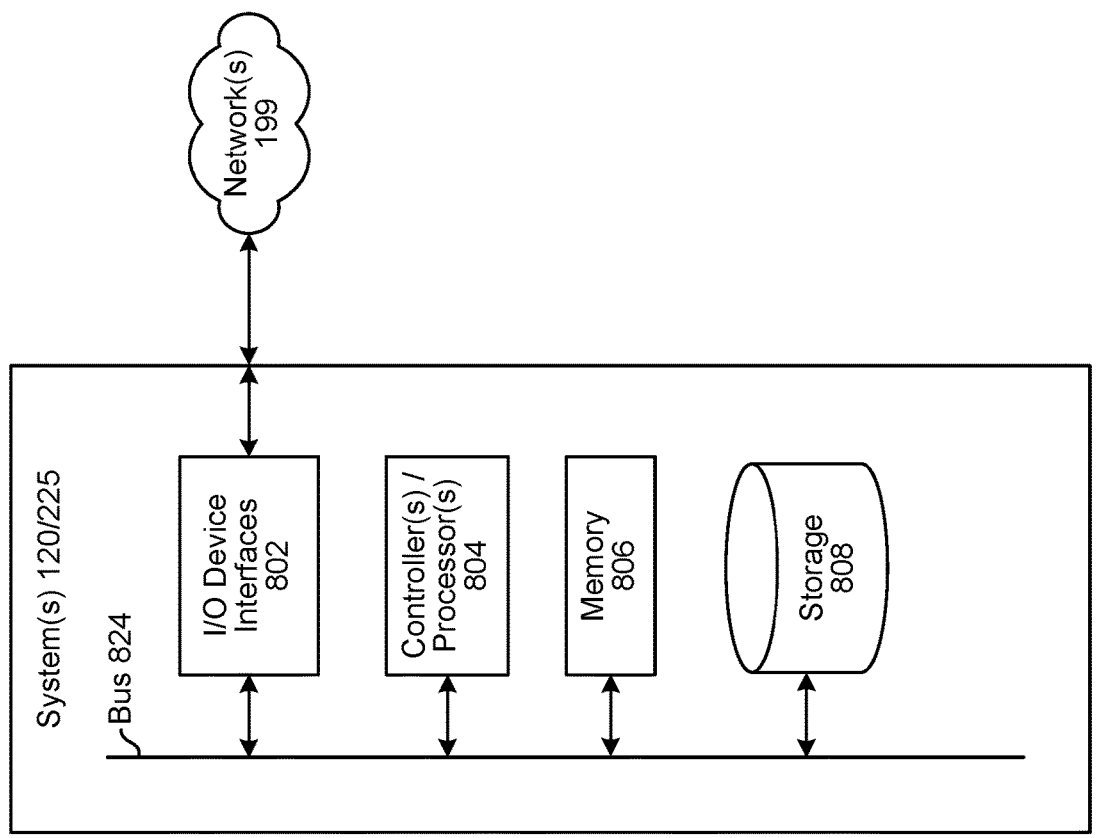
FIG. 8 is a block diagram conceptually illustrating example components of a system, according to embodiments of the present disclosure.

FIG. 7 is a block diagram conceptually illustrating a device 110 that may be used with the system 120. FIG. 8 is a block diagram conceptually illustrating example components of a remote device, such as the system 120 or a skill 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 for performing ASR processing, one or more systems 120 for performing NLU processing, one or more skill 225, one or more skills 225, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (702/802).

Computer instructions for operating each device (110/120/225) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225) includes input/output device interfaces (702/802). A variety of components may be connected through the input/output device interfaces (702/802), as will be discussed further below. Additionally, each device (110/120/225) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or the skill 225 may include their own dedicated processors, memory, and/or storage. Alternatively, one or more of the components of the device 110, the system 120, and/or the skill 225 may utilize the I/O interfaces (702/802), processor(s) (704/804), memory (706/806), and/or storage (708/808) of the device 110, the system 120, or the skill 225, respectively. Thus, the SLU component 240 may have its own I/O interface(s), processor(s), memory, and/or storage; the TTS component 280 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

Figure 9:
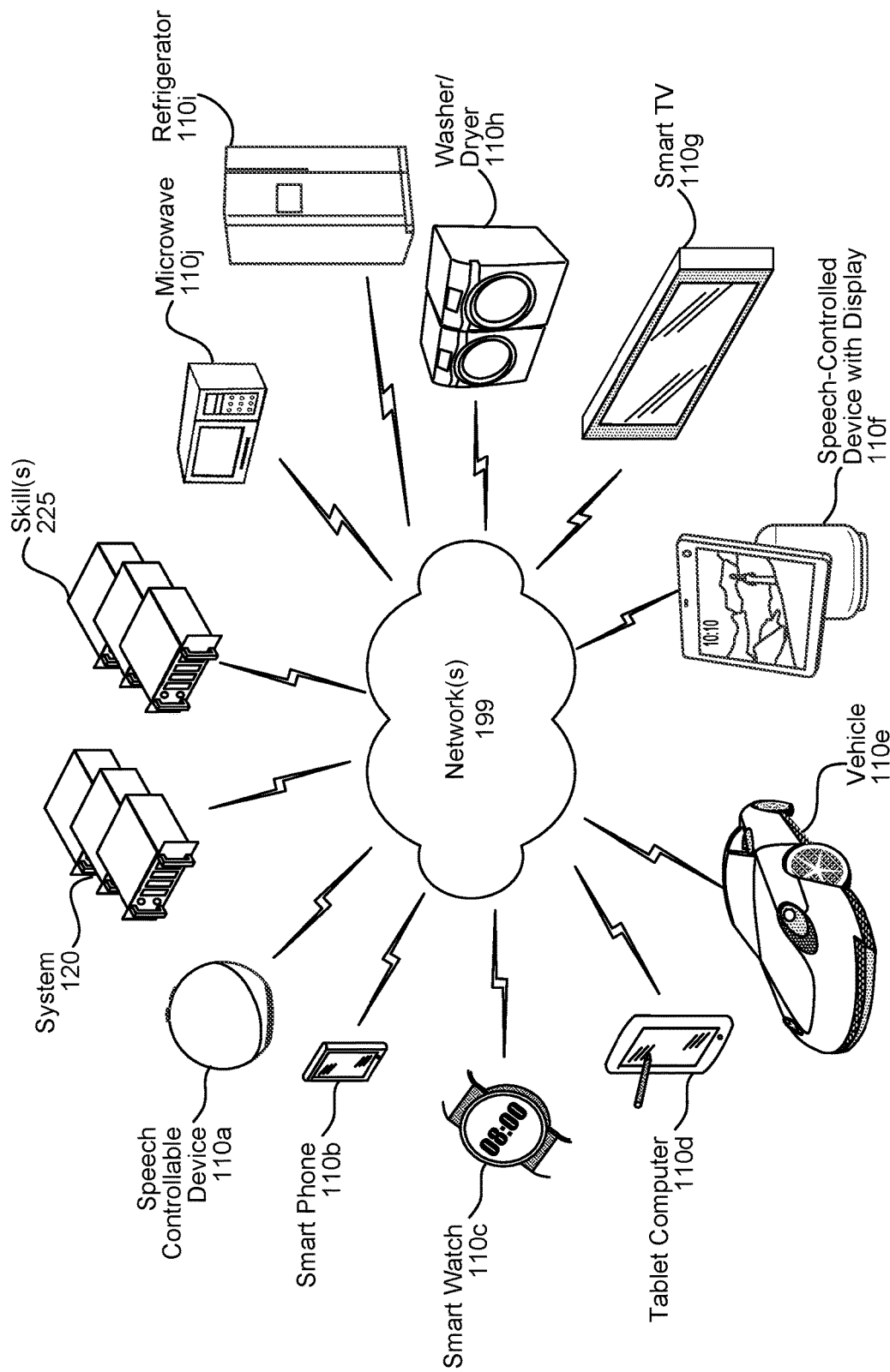
FIG. 9 illustrates an example of a computer network for use with the overall system, according to embodiments of the present disclosure.

As illustrated in FIG. 9, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining an automatic speech recognition (ASR) training dataset including at least first audio data representing a first spoken natural language input and a first ASR token data corresponding to the first audio data;
   determining a spoken language understanding (SLU) training dataset including at least second audio data representing a second spoken natural language input, a first intent corresponding to the second spoken natural language input and a first entity represented in the second spoken natural language input;
   determining a first natural language understanding (NLU) training dataset including at least first text data representing a first natural language input, a second intent corresponding to the first natural language input and a second entity represented in the first natural language input;
   processing the ASR training dataset to determine a first encoder and a first decoder configured to perform ASR processing;
   processing the SLU training dataset using the first encoder and the first decoder to determine a second encoder and a second decoder configured to perform SLU processing;

processing the NLU training dataset using a third encoder and the second decoder to determine a fourth encoder and a third decoder configured to perform NLU processing;

generating a SLU component including an audio encoder corresponding to the second encoder, a text encoder corresponding to the fourth encoder and a joint decoder corresponding to the third decoder;

receiving first input audio data representing a third spoken natural language input;

processing the first input audio data using the audio encoder and the joint decoder to determine a first NLU data representing the third spoken natural language input; and determining, using the first NLU data, first output data responsive to the third spoken natural language input.

2. The computer-implemented method of claim 1, further comprising:

after determining the SLU component, determining a second NLU training dataset including at least second text data representing a second natural language input and a third intent corresponding to the second natural language input, the second NLU training dataset corresponding to a set of inputs the SLU component is to be configured to process;

processing the second NLU training dataset using the text encoder and the joint decoder to determine an updated text encoder and an updated joint decoder;

receiving second input audio data representing a fourth spoken natural language input included in the set of inputs;

processing the second input audio data using the audio encoder and the updated joint decoder to determine second NLU data representing the fourth spoken natural language input; and determining, using the second NLU data, second output data responsive to the fourth spoken natural language input.

3. The computer-implemented method of claim 1, wherein:

processing the ASR training dataset using the first encoder and the first decoder further comprises processing, by the first decoder, first task label data representing an ASR processing task;

processing the SLU training dataset using the second encoder and the second decoder further comprises processing, by the second decoder, second task label data representing a SLU processing task; and processing the NLU training dataset using the fourth encoder and the third decoder further comprises processing, by the third encoder, third task label data representing a NLU processing task.

4. The computer-implemented method of claim 1, further comprising:

receiving input text data representing a second natural language input;

processing the input text data using the text encoder and the joint decoder to determine second NLU data representing the second natural language input; and determining, using the second NLU data, second output data responsive to the second spoken natural language input.

5. A computer-implemented method comprising:

receiving first input audio data;

processing the first input audio data using a spoken language understanding (SLU) component, the SLU component including:

an audio encoder configured to perform an audio-to-text processing task and an audio-to-natural language understanding (NLU) processing task, and a joint decoder configured to perform the audio-to-text processing task, the audio-to-NLU processing task and a text-to-NLU processing task;

determining first NLU data corresponding to the first input audio data; and determining, using the first NLU data, first output data responsive to the first input audio data.

6. The computer-implemented method of claim 5, wherein processing the first input audio data using the SLU component comprises:

processing the first input audio data using the audio encoder to determine encoded audio data; and processing the encoded audio data using the joint decoder to determine the first NLU data.

7. The computer-implemented method of claim 5, further comprising:

receiving input token data representing a natural language input;

processing the input token data using a text encoder to determine encoded token data, the text encoder included in the SLU component and configured to perform the text-to-NLU processing task;

processing the encoded token data using the joint decoder to determine second NLU data corresponding to the natural language input; and determining, using the second NLU data, second output data responsive to the natural language input.

8. The computer-implemented method of claim 5, further comprising:

determining log filterbank (LFB) features using the input audio data; and wherein processing the first input audio data using the SLU component comprises processing the LFB features using at least one convolutional layer of the audio encoder.

9. The computer-implemented method of claim 5, further comprising:

determining a first dataset including a plurality of annotated ASR data, wherein first annotated ASR data of the plurality of annotated ASR data includes second audio data representing a first spoken input, the first annotated ASR data further including ASR token data corresponding to the first spoken input;

processing the first dataset using a first encoder and a first decoder to determine a second encoder and a second decoder, the second encoder and the second decoder configured to perform the audio-to-text processing task;

determining a second dataset including a plurality of annotated NLU data, wherein first annotated NLU data of the plurality of annotated NLU data includes first token data representing a natural language input, the first annotated NLU data further including a first intent corresponding to the natural language input and a first entity represented in the natural language input; and processing the second dataset using a third encoder and the second decoder to determine a fourth encoder and a third decoder, the fourth encoder and the third decoder configured to perform the text-to-NLU processing task.

10. The computer-implemented method of claim 5, further comprising:

receiving, at a speech controllable device, audio representing a spoken input;

determining, at the speech controllable device, the first input audio data corresponding to the audio, and wherein processing the first input audio data using the SLU component comprises processing, at the speech controllable device, the first input audio data using the SLU component.

11. The computer-implemented method of claim 5, further comprising:

determining a first training dataset including a plurality of masked audio data, a first masked audio data of the plurality of masked audio data corresponding to a spoken input, wherein representation of at least one word included in the spoken input is masked in the first masked audio data;

processing the first training dataset using a first encoder and a first decoder, to configure the first encoder and the first decoder to predict the spoken input from the first masked audio data;

storing the first encoder as the audio encoder; and storing the first decoder as the joint decoder.

12. The computer-implemented method of claim 5, further comprising:

determining a first dataset including at least first token data representing a natural language input and second NLU data corresponding to the first token data, the first dataset corresponding to a set of inputs the SLU component is to be configured to process;

processing the first dataset using a text encoder included in the SLU component and the joint decoder to determine an updated text encoder and updated joint decoder;

receiving second input audio data representing a spoken input included in the set of inputs;

processing the second input audio data using the audio encoder and the updated joint decoder to determine second NLU data corresponding to the second input audio data; and determining, using the second NLU data, second output data responsive to the second input audio data.

13. A system comprising:

at least one processor; and at least one memory comprising instructions that, when executed by the at least one processor, cause the system to:

receive first input audio data;

process the first input audio data using a spoken language understanding (SLU) component, the SLU component including:

an audio encoder configured to perform an audio-to-text processing task and an audio-to-natural language understanding (NLU) processing task, and a joint decoder configured to perform the audio-to-text processing task, the audio-to-NLU processing task and a text-to-NLU processing task;

determine first NLU data corresponding to the first input audio data; and determine, using the first NLU data, first output data responsive to the first input audio data.

14. The system of claim 13, wherein the at least one memory further comprises instructions that, when executed by the at least one processor, cause the system to process the first input audio data using the SLU component further causes the system to:

process the first input audio data using the audio encoder to determine encoded audio data; and process the encoded audio data using the joint decoder to determine the first NLU data.

15. The system of claim 13, wherein the at least one memory further comprises instructions that, when executed by the at least one processor, further cause the system to:

receive input token data representing a natural language input;

process the input token data using a text encoder to determine encoded token data, the text encoder included in the SLU component and configured to perform the text-to-NLU processing task;

process the encoded token data using the joint decoder to determine second NLU data corresponding to the natural language input; and determine, using the second NLU data, second output data responsive to the natural language input.

16. The system of claim 13, wherein the at least one memory further comprises instructions that, when executed by the at least one processor, further cause the system to:

determine log filterbank (LFB) features using the input audio data; and wherein the instructions that cause the system to process the first input audio data using the SLU component further causes the system to process the LFB features using at least one convolutional layer of the audio encoder.

17. The system of claim 13, wherein the at least one memory further comprises instructions that, when executed by the at least one processor, further cause the system to:

determine a first dataset including a plurality of annotated ASR data, wherein first annotated ASR data of the plurality of annotated ASR data includes second audio data representing a first spoken input, the first annotated ASR data further including ASR token data corresponding to the first spoken input;

process the first dataset using a first encoder and a first decoder to determine a second encoder and a second decoder, the second encoder and the second decoder configured to perform the audio-to-text processing task;

determine a second dataset including a plurality of annotated NLU data, wherein first annotated NLU data of the plurality of annotated NLU data includes first token data representing a natural language input, the first annotated NLU data further including a first intent corresponding to the natural language input and a first entity represented in the natural language input; and process the second dataset using a third encoder and the second decoder to determine a fourth encoder and a third decoder, the fourth encoder and the third decoder configured to perform the text-to-NLU processing task.

18. The system of claim 17, wherein the at least one memory further comprises instructions that, when executed by the at least one processor, further cause the system to:

receive, at a speech controllable device, audio representing a spoken input;

determine, at the speech controllable device, the first input audio data corresponding to the audio; and process, at the speech controllable device, the first input audio data using the SLU component.

19. The system of claim 13, wherein the at least one memory further comprises instructions that, when executed by the at least one processor, further cause the system to:

determine a first training dataset including a plurality of masked audio data, a first masked audio data of the plurality of masked audio data corresponding to a spoken input, wherein representation of at least one word included in the spoken input is masked in the first masked audio data;

process the first training dataset using a first encoder and a first decoder, to configure the first encoder and the first decoder to predict the spoken input from the first masked audio data;

store the first encoder as the audio encoder; and store the first decoder as the joint decoder.

20. The system of claim 13, wherein the at least one memory further comprises instructions that, when executed by the at least one processor, further cause the system to:

determine a first dataset including at least first token data representing a natural language input and second NLU data corresponding to the first token data, the first dataset corresponding to a set of inputs the SLU component is to be configured to process;

process the first dataset using a text encoder included in the SLU component and the joint decoder to determine an updated text encoder and updated joint decoder;

receive second input audio data representing a spoken input included in the set of inputs;

process the second input audio data using the audio encoder and the updated joint decoder to determine second NLU data corresponding to the second input audio data; and determine, using the second NLU data, second output data responsive to the second input audio data.

* * * * *